(12) United States Patent
Hirai et al.

(10) Patent No.: US 9,200,552 B2
(45) Date of Patent: Dec. 1, 2015

(54) APPARATUS FOR CONTROLLING SUPPLY POWER TO CONDUCTIVE CARRIER OF CATALYST CONVERTER

(75) Inventors: Taro Hirai, Kariya (JP); Noriaki Ikemoto, Kariya (JP); Takeshi Harada, Kariya (JP); Naoyuki Kamiya, Kariya (JP); Hisashi Iida, Kariya (JP)

(73) Assignee: DENSO CORPORATION, Kariya (JP)

( * ) Notice: Subject to any disclaimer, the term of this patent is extended or adjusted under 35 U.S.C. 154(b) by 672 days.

(21) Appl. No.: 13/096,276

(22) Filed: Apr. 28, 2011

(65) Prior Publication Data

US 2011/0265460 A1 Nov. 3, 2011

(30) Foreign Application Priority Data

Apr. 28, 2010 (JP) ................. 2010-103575

(51) Int. Cl.
*F01N 3/18* (2006.01)
*F01N 3/10* (2006.01)
*F01N 3/20* (2006.01)
*F01N 9/00* (2006.01)
*F01N 13/00* (2010.01)

(52) U.S. Cl.
CPC ............. *F01N 3/101* (2013.01); *F01N 3/2026* (2013.01); *F01N 9/00* (2013.01); *F01N 13/009* (2013.01); *F01N 2240/16* (2013.01); *F01N 2900/1628* (2013.01); *Y02T 10/22* (2013.01); *Y02T 10/26* (2013.01); *Y02T 10/47* (2013.01)

(58) Field of Classification Search
CPC ................... F01N 2900/1628; F01N 2240/16; F01N 3/2026; F01N 2550/02; F01N 2550/22; F01N 2900/0422; F01N 2900/0602; F01N 2900/1602

USPC .................................... 60/284, 286, 300, 303
See application file for complete search history.

(56) References Cited

U.S. PATENT DOCUMENTS

| 5,758,492 A | 6/1998 | Kato et al. |
| 2003/0172646 A1 | 9/2003 | Hiratsuka et al. |
| 2012/0004801 A1 | 1/2012 | Watanabe |

FOREIGN PATENT DOCUMENTS

| JP | H06-042339 | 2/1994 |
| JP | H06-173663 | 6/1994 |

(Continued)

OTHER PUBLICATIONS

Japanese Official Action dated Oct. 16, 2012 issued in corresponding Japanese Application No. 2010-103575, with English translation.

(Continued)

*Primary Examiner* — Kenneth Bomberg
*Assistant Examiner* — Jonathan Matthias
(74) *Attorney, Agent, or Firm* — Nixon & Vanderhye P.C.

(57) ABSTRACT

In an apparatus for controlling supply power to a conductive porous carrier of a catalyst converter for cleaning an emission, a moisture determiner determines whether moisture is contained in and/or on the conductive porous carrier. A power controller controls supply power to the conductive porous carrier for energization of the conductive porous carrier such that a value of the supply power to the conductive porous carrier when it is determined that the moisture is contained in and/or on the conductive porous carrier is lower than a value of the supply power to the conductive porous carrier when it is determined that the moisture is not contained in and/or on the conductive porous carrier.

9 Claims, 8 Drawing Sheets

(56) References Cited

FOREIGN PATENT DOCUMENTS

| | | |
|---|---|---|
| JP | P2003-343334 A | 12/2003 |
| JP | 3602614 | 10/2004 |
| JP | P2005-194935 A | 7/2005 |
| JP | P2007-278802 A | 10/2007 |
| JP | 2008267157 A * | 11/2008 |
| JP | P2009-191681 A | 8/2009 |
| JP | P2010-202012 A | 9/2010 |
| JP | P2010-223159 A | 10/2010 |

OTHER PUBLICATIONS

Japanese Office Action dated Feb. 14, 2012, issued in corresponding Japanese Application No. 2010-103575, with English translation.

* cited by examiner

APPARATUS FOR CONTROLLING SUPPLY POWER TO CONDUCTIVE CARRIER OF CATALYST CONVERTER

CROSS REFERENCE TO RELATED APPLICATIONS

This application is based on Japanese Patent Application 2010-103575 filed on Apr. 28, 2010. This application claims the benefit of priority from the Japanese Patent Application, so that the descriptions of which are all incorporated herein by reference.

TECHNICAL FIELD

The present disclosure relates to apparatuses for controlling supply power to a conductive carrier of an electrically heated catalyst converter to be used for cleaning engine emissions.

BACKGROUND

Engine emission control is one of the important technologies installed in modern motor vehicles. In order to clean exhaust emissions through the exhaust pipe of an internal combustion engine, a catalyst converter is normally provided in the exhaust pipe. Catalyst converters, each of which consists of a catalyst and a metal carrier carrying it, are characterized to activate with their temperatures equal to or higher than an activation temperature, and, in the activated state, oxidize particular components in the exhaust emissions. Thus, when the temperature of a catalyst converter provided in the exhaust pipe is lower than its activation temperature during, for example, engine start-up, heating the catalyst converter to activate the catalyst converter as soon as possible is required. As an example of how to heat a catalyst converter, U.S. Pat. No. 5,758,492 corresponding to Japanese Examined Patent Publication No. 3602614 discloses an electrically heated catalyst converter, referred to simply as an "EHC converter", which supplies current to the metal carrier of the EHC converter to thereby heat the metal carrier.

SUMMARY

The inventors have discovered that there is a problem in cases of applying, to an EHC converter, a conductive ceramic carrier as an example of conductive porous carriers in place of the metal carrier.

Specifically, ceramic is porous material with a lot of very small holes (pores) therein and thereon. If a conductive ceramic carrier were abruptly heated with moisture filled in some pores, thermal expansion of the moisture would arise without escape, that is, "bumping" of the moisture would arise (see the reference character 21x in FIG. 4). This might cause a risk of damage to the ceramic carrier.

Particularly, although the EHC converter can be energized to increase the temperature of the ceramic carrier before engine-startup, the energization of the ceramic carrier may heat the ceramic carrier without the moisture blown off by the exhaust emissions. This may result in the moisture remaining in some pores. Thus, the greater the amount of heating of the ceramic carrier is, the more the bumping of the moisture may be likely to occur.

In view of the circumstances set forth above, an aspect of the present disclosure seeks to provide apparatuses for controlling supply power to a conductive porous carrier of an electrically heated catalyst converter; these apparatuses are designed to solve the problem set forth above.

Specifically, an alternative aspect of the present disclosure aims to provide such apparatuses capable of reducing a risk of the occurrence of the bumping of moisture in and/or on the conductive porous carrier.

According to one aspect of the present disclosure, there is provided an apparatus for controlling supply power to a conductive porous carrier of a catalyst converter for cleaning an emission. The conductive porous carrier carries a catalyst of the catalyst converter. The conductive porous carrier is energized for warm of the catalyst. The apparatus includes a moisture determiner to determine whether moisture is contained in and/or on the conductive porous carrier. The apparatus includes a power controller to control the supply power to the conductive porous carrier for energization of the conductive porous carrier such that a value of the supply power to the conductive porous carrier when it is determined that the moisture is contained in and/or on the conductive porous carrier is lower than a value of the supply power to the conductive porous carrier when it is determined that the moisture is not contained in and/or on the conductive porous carrier.

According to an alternative aspect of the present disclosure, there is provided a computer program product for an apparatus for controlling supply power to a conductive porous carrier of a catalyst converter for cleaning an emission. The conductive porous carrier carries a catalyst of the catalyst converter, and the conductive porous carrier is energized for warm of the catalyst. The computer program product includes a computer usable medium, and a set of computer program instructions embodied on the computer useable medium. The instructions include a first instruction to determine whether moisture is contained in and/or on the conductive porous carrier. The instructions include a second instruction to control the supply power to the conductive porous carrier for energization of the conductive porous carrier such that a value of the supply power to the conductive porous carrier when it is determined that the moisture is contained in and/or on the conductive porous carrier is lower than a value of the supply power to the conductive porous carrier when it is determined that the moisture is not contained in and/or on the conductive porous carrier.

The inventors have found that, if there is no local heating in the conductive carrier, the first parameter has a correlation with the second parameter. Because the second parameter has the second correlation with the temperature of the conductive carrier, the diagnostic apparatus according to the one aspect of the present disclosure and the computer program product according to the alternative aspect of the present disclosure can determine the temperature state of the conductive carrier based on a result of the comparison between the first parameter and the second parameter, such as the difference therebetween.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

Embodiments of the present disclosure will be described hereinafter with reference to the accompanying drawings. In the drawings, identical reference characters are utilized to identify corresponding identical components.

First Embodiment

Figure 1:
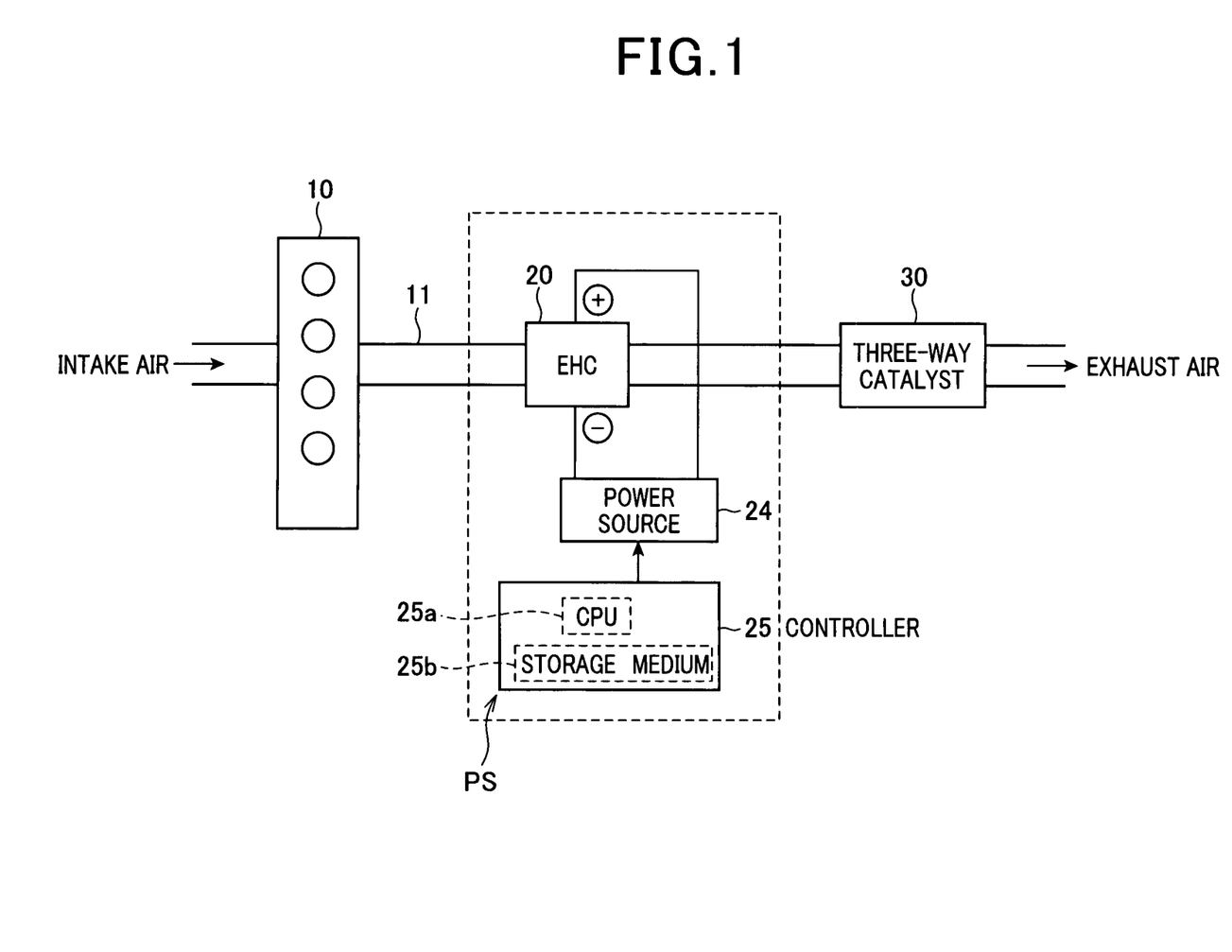
FIG. 1 is a schematic structural view of a power supply system for supplying power to an electrically heated catalyst (EHC) converter located in an exhaust pipe of an internal combustion engine according to the first embodiment of the present disclosure.

Referring to FIG. 1, there is illustrated an internal combustion engine 10 with an exhaust pipe 11, an electrically heated catalyst converter (EHC converter) 20, and a power supply system PS for supplying power to the EHC converter 20. An apparatus for controlling supply power to the EHC converter 20 according to the first embodiment of the present disclosure is, for example, designed as a part of the power supply system PS; this apparatus can be referred to as a "power-supply control apparatus" hereinafter.

As an example of internal combustion engines, a spark-ignited gasoline engine is used. The spark-ignited gasoline engine, referred to simply as an engine, 10 is installed in a motor vehicle. The motor vehicle installs therein a drive motor (not shown). The engine 10 and drive motor cooperatively operate as a drive source of the motor vehicle.

Specifically, the engine 10 works to compress air-fuel mixture by the piston within each cylinder using intake air, and burn the compressed air-fuel mixture within each cylinder. This changes the fuel energy to mechanical energy, such as rotative energy, to reciprocate the piston within each cylinder, thus rotating a crankshaft (not shown) of the engine 10. The rotation of the crankshaft is transferred to driving wheels through a powertrain installed in the motor vehicle to thereby drive the motor vehicle.

The drive motor works to rotate the crankshaft when energized.

In the exhaust pipe 11 of the engine 10, the EHC converter 20 and a three-way catalyst 30 are provided. The EHC converter 20 is located downstream of the engine 10, and the three-way catalyst 30 is located downstream of the EHC converter 20. The EHC converter 20 is characterized to activate with its temperature equal to or higher than a predetermined activation temperature, and, in the activated state, the EHC converter 20 oxidizes hydrocarbons (HC) in exhaust emissions out of the engine 10 through the exhaust pipe 11, and reduces carbon monoxide (CO) and oxides of nitrogen (NOx) in the exhaust emissions to purify the HC, CO, and NOx. Similarly, the three-way catalyst 30 is characterized to activate with its temperature equal to or higher than a predetermined activation temperature, and, in the activated state, the three-way catalyst 30 oxidizes HC in the exhaust emissions through the exhaust pipe 11, and reduces CO and NOx in the exhaust emissions to purify the HC, CO, and NOx.

For example, the EHC converter 20 is smaller in size than the three-way catalyst 30 to reduce the time required for the EHC converter 20 to reach the activation temperature.

Figure 2:
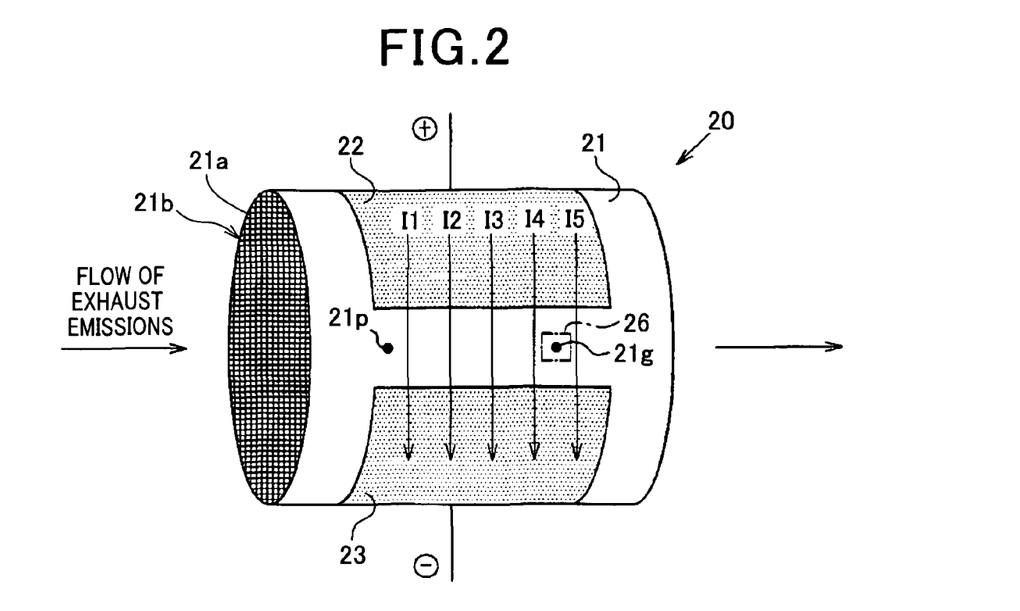
FIG. 2 is an enlarged perspective view of the EHC converter illustrated in FIG. 1.

FIG. 2 is an enlarged perspective view of an example of the structure of the EHC converter 20. The EHC converter 20 is comprised of a substantially cylindrical ceramic carrier 21 with conductivity.

The power supply system PS includes a pair of positive and negative electrodes 22 and 23, a power source 24, and a controller 25. The positive electrode 22 is mounted on one part of the outer circumferential surface of the ceramic carrier 21, and the negative electrode 23 is so mounted on another part of the outer circumferential surface of the ceramic carrier 21 as to be opposite to the positive electrode 22 with gaps therebetween.

Figure 3:
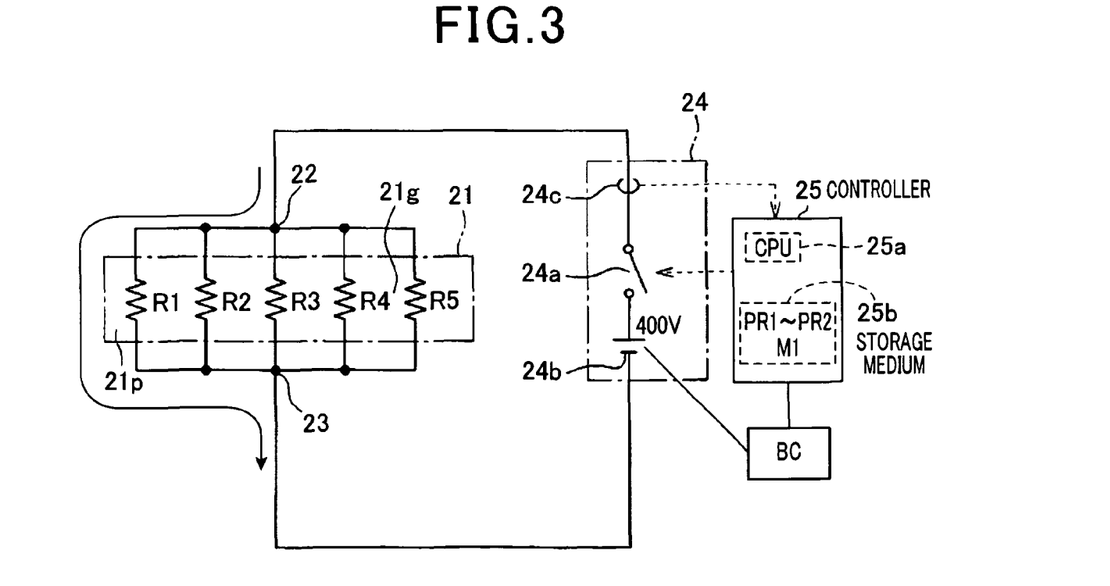
FIG. 3 is an equivalent circuit diagram of the power supply system and the ceramic carrier of the EHC converter according to the first embodiment.

The power source 24 is electrically connected with the positive and negative electrodes 22 and 23 via corresponding conductors (wires). As illustrated in FIG. 3, the motor vehicle according to the first embodiment includes a battery, such as a lithium rechargeable battery, 24b for driving the drive motor. The power source 24 is designed to apply a terminal voltage of, for example, an approximately 400 Volts (V), across the positive and negative terminals 22 and 23. The power source 24 also includes a switch 24a located at the conductor between the battery 24b and the positive terminal 22. The switch 24 is controllably connected with the controller 25, and is designed to open or close according to instructions sent from the controller 25.

That is, when the terminal voltage is applied across the positive and negative electrodes 22 and 23, currents flow from the positive electrode 22 to the negative electrode 23 through the ceramic carrier 21 (see reference characters I1 to I5 in FIG. 2). This causes the ceramic carrier 21 to heat up, increasing in temperature.

The power source 24 also includes a current sensor 24c for measuring supply current from the battery 24b to the ceramic carrier 21. The current sensor 24c is electrically connected with the controller 25, and the current value measured by the current sensor 24c is output therefrom to the controller 25.

Generally, conductive ceramic is produced by adding conductive material to ceramic material. Nonuniform distribution of the conductive material, nonuniform distribution of the density of the ceramic material, and/or nonuniform thickness of the conductive ceramic may cause different resistance portions in the conductive ceramic.

For at least these reasons, the conductive ceramic carrier 21 consists of a plurality of identically-shaped unit portions with different resistance values. For example, if the electrically conducting path of the ceramic carrier 21 between the positive and negative electrodes 22 and 23 consists of five unit sections in the direction of the current with different resistance values, the electrical connection between the positive and negative electrodes 22 and 23 via the ceramic carrier 21 can be expressed as an equivalent circuit illustrated in FIG. 3 in which five resistors R1 to R5 with different resistance values are connected between the positive and negative electrodes 22 and 23 in parallel with each other.

Reference characters I1 to I5 illustrated in FIG. 2 represent currents individually flowing through the respective resistors R1 to R5. For example, if the resistance value of the resistor R1 is the lowest in the five resistors R1 to R5, the current I1 is the highest in all of the currents I1 to I5. This causes the amount of heat of the unit portion of the ceramic carrier 21 corresponding to the resistor R1 to increase more than another unit portion; this unit portion corresponding to the resistor R1 with the highest resistance value will be referred to as a lower-resistance portion 21p hereinafter. However, if the amount of supply power to the ceramic carrier 21 is relatively low, heat production in the locally heated portion 21p due to local heating is not so large compared to heat transfer from the locally heated portion 21p to another portion. Thus, significant temperature rise in the locally heated portion 21p can be prevented.

A battery controller BC installed in the motor vehicle is operative to measure the terminal voltage of the battery 24b to control the amount of charge in the battery 24b based on the measured terminal voltage. The battery controller BC is also operative to supply, to the controller 25, the measured terminal voltage.

The controller 25 is designed as, for example, a normal microcomputer circuit consisting of, for example, a CPU 25a; a storage medium 25b including a ROM (Read Only Memory), such as a rewritable ROM, a RAM (Random Access Memory), and the like; an I/O (Input and output) interface; buses; and so on. The CPU 25a, storage medium 25b, and the I/O interface are communicably connected with each other via the buses. The storage medium 25b stores therein beforehand various programs including a power control program PR1 described later.

Specifically, the controller 25, that is, its CPU 25a, is operative to calculate, based on the measured current value inputted from the current sensor 24 and the measured terminal voltage inputted from the battery controller BC, resistance R of the electrically conducting path of the ceramic carrier 21 between the positive and negative electrodes 22 and 23; the resistance R is equivalent to the combined resistance of the resistance values of the resistors R1 to R5. The resistance R of the electrically conducting path of the ceramic carrier 21 between the positive and negative electrodes 22 and 23 will also be referred to as a "resistance R of the ceramic carrier 21".

Note that temperature T of the ceramic carrier 21 and the resistance R of the electrically conducting path of the ceramic carrier 21 between the positive and negative electrodes 22 and 23 have a correlation therebetween; this correlation will be referred to as an "R-T characteristic" of the ceramic carrier 21. In the first embodiment, the storage medium 25b stores therein a map M1 designed as, for example, a data table, a program, and/or a formula; this map M1 represents the R-T characteristic between a variable of the temperature T of the ceramic carrier 21 and a variable of the resistance R of the electrically conducting path of the ceramic carrier 21 between the positive and negative electrodes 22 and 23. The map M1 can have been determined based on data obtained by tests and/or simulations using the power supply system PS, the engine 10, and the EHC converter 20 or their equivalent computer models.

Specifically, the CPU 25a of the controller 25 is operative to reference the map M1 using a calculated value of the resistance R of the ceramic carrier 21 as a key to extract, based on a result of the reference, a value of the temperature T of the ceramic carrier 21 corresponding to the calculated value of the resistance R thereof. In the first embodiment, the R-T characteristic of the ceramic carrier 21 is an NTC (Negative Temperature Coefficient) characteristic in which electrical resistance of the ceramic carrier 21 drops with temperature increase. In other words, the ceramic carrier 21 is made from, for example, an SiC (Silicon Carbide) material having such an NTC characteristic.

Figure 4:
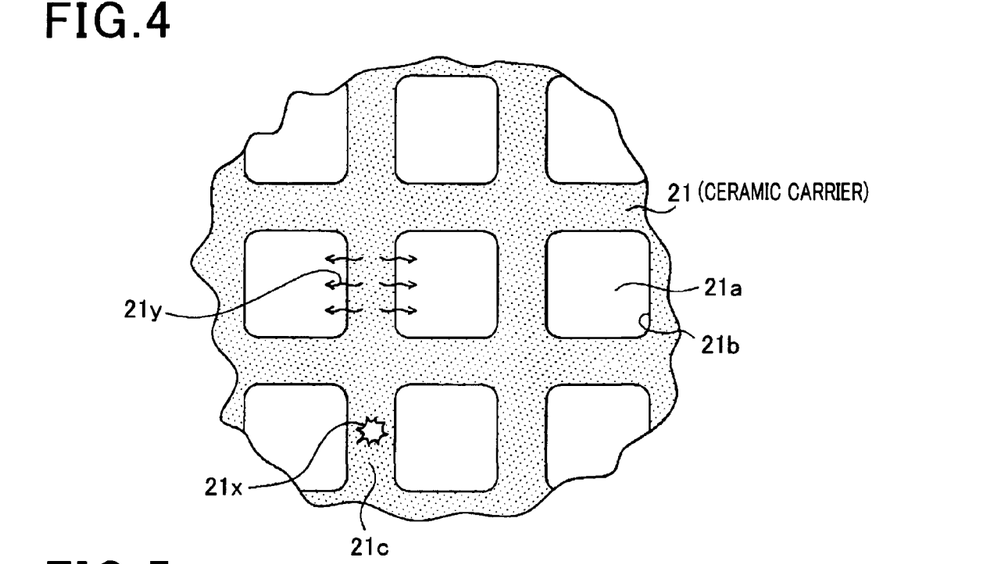
FIG. 4 is an enlarged axial end view of the ceramic carrier as viewed in the arrow IV illustrated in FIG. 2.

FIG. 4 is an enlarged axial end view of the ceramic carrier 21 as viewed in the arrow IV illustrated in FIG. 2.

As illustrated in FIGS. 2 and 4, the ceramic carrier 21 has a substantially honeycomb shape with a honeycomb wall 21c forming many channels (flow-through cells) 21a therein; these channels 21a are arranged in the flow direction of the exhaust emissions through the exhaust pipe 11. That is, the honeycomb wall 21c of the ceramic carrier 21 defines the channels 21a. On the inner surface of the honeycomb wall 21c, which faces a corresponding channel 21a, a catalyst layer 21b is carried by, for example, coating. The ceramic carrier 21 allows the exhaust emissions to pass through the channels 21a. While the exhaust emissions is passing through the channels 21a, harmful components in the exhaust emissions are oxidized or reduced by the catalyst layers 21b so that the exhaust emissions are cleaned to be outputted from the exhaust pipe 21a.

Note that ceramic is porous material with a lot of very small holes (pores) therein. If the ceramic carrier 21 were abruptly heated with moisture filled in some pores, thermal expansion of the moisture would arise within the ceramic carrier 21 without escape, that is, "bumping" of the moisture would arise (see reference character 21x in FIG. 4). This might cause a risk of damage to a part of the wall 21c forming the channels 21a; this part corresponds to some pores in which the moisture is filled.

Particularly, although the EHC converter 20 can be energized to increase the temperature of the ceramic carrier 21 before engine-startup, the energization of the ceramic carrier 21 may heat the ceramic carrier 21 without the moisture blown off by the exhaust emissions. This may result in the moisture remaining in some pores. Thus, the greater the amount of heating of the ceramic carrier 21 is, the more the bumping of the moisture may be likely to occur.

In view of the aforementioned circumstances, the controller 25 of the power supply system PS is configured to carry out power control in accordance with the power control program PR1 to: determine whether moisture is contained in the ceramic carrier 21, and reduce supply power to the ceramic carrier 21 when it is determined that moisture is contained in the ceramic carrier 21 as compared with supply power to the ceramic carrier 21 when it is determined that no moisture is contained in the ceramic carrier 21.

Figure 5:
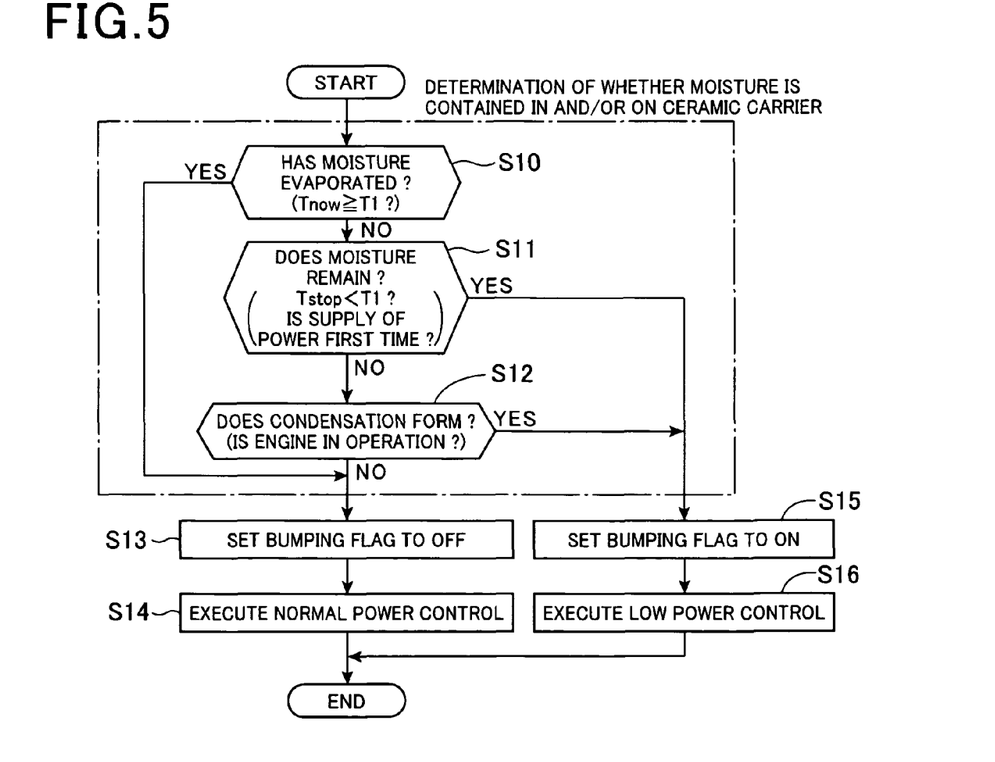
FIG. 5 is a flowchart schematically illustrating a sequence of operations of the CPU of a controller in accordance with a power control program according to the first embodiment.

FIG. 5 is a flowchart schematically illustrating a sequence of operations of the CPU 25a, while focusing on determination of whether moisture is contained in the ceramic carrier 21, in accordance with the power control program PR1. In other words, the power supply system PS serves as the apparatus for controlling supply power to the ceramic carrier 21.

The CPU 25a repeatedly runs the power control program PR1 in a preset cycle during catalyst warm-up being requested to the CPU 25a when the temperature of the catalyst layers 21b, that is, the temperature of the ceramic carrier 21 is lower than the activation temperature of the catalyst layers 21b. That is, when determining that the catalyst warm-up request occurs, the CPU 25a is programmed to turn on the switch 24a to supply power from the power source 24 to the ceramic carrier 21 of the EHC converter 20 without waiting engine start-up.

In other words, another catalyst-warm approach to increase the temperature of the exhaust emissions from the engine 10 to warm the catalyst layers 21b by the high-temperature exhaust emissions can be carried out only during the engine 10 being activated. In contrast, the catalyst warm-up using the power supply system PS can be carried out before engine start-up. Thus, the catalyst warm-up request can occur independently of the operating conditions of the engine 10.

When launching the power control program PR1, the CPU 25a determines whether a value mow of the temperature at this time is equal to or higher than a preset evaporating temperature T1, such as 100° C. in step S10. For example, in step S10, the CPU 25a calculates, based on the measured current value inputted from the current sensor 24 and the measured terminal voltage inputted from the battery controller BC, the resistance R of the electrically conducting path of the ceramic carrier 21 between the positive and negative electrodes 22 and 23; the resistance R is equivalent to the combined resistance of the resistance values of the resistors R1 to R5.

In step S10, the CPU 25a references the map M1 using the calculated value of the resistance R of the ceramic carrier 21 as a key to extract, based on a result of the reference, a value Tnow of the temperature T of the ceramic carrier 21 corresponding to the calculated value of the resistance R thereof. In other words, the CPU 25a converts the calculated value of the resistance R of the ceramic carrier 21 into the value mow of the temperature T using the map M1.

Upon determining that the value Mow of the temperature T of the ceramic carrier 21 is equal to or higher than the preset evaporating temperature T1 (YES in step S10), the CPU 25a considers that, even if moisture was contained in the ceramic carrier 21, the moisture has evaporated to disappear. Then, the CPU 25a sets or maintains a bumping flag in the form of, for example, a bit to OFF (0) in step S13. For example, the bumping flag is set to an initial value of OFF (0).

Otherwise, upon determining that the value Tnow of the temperature T of the ceramic carrier 21 is lower than the preset evaporating temperature T1 (NO in step S10), the CPU 25a considers that there is a possibility of moisture being contained in the ceramic carrier 21, proceeding to step S11. In step S11, as long as power is supplied to the ceramic carrier 21 with the engine 10 shutdown (non-operating), the CPU 25a determines whether moisture (water vapor) generated by the ignition of the engine 10 during the last operating time remains in and/or on the ceramic carrier 21. If the engine 10 operates, the CPU 25a proceeds to step S12 while skipping the operation in step S11. Specifically, when the air-fuel mixture burns at the last ignition before the engine shutdown, hydrocarbons (HC) contained in the fuel is oxidized by oxygen ($O_2$) contained in the intake air so that water vapor ($H_2O$) is generated. This results in that the water vapor may be attached onto the ceramic carrier 21. Thus, when power supply to the ceramic carrier 21 is started at the next engine start-up, there may be a risk of the bumping of the reminder of the water vapor (moisture). The operation in step S11 is to determine whether such water vapor remains in and/or on the ceramic carrier 21.

Specifically, the CPU 25a determines whether a value Tstop of the temperature T of the ceramic carrier 21 (catalyst layers 21b) at the last engine shutdown is lower than the evaporating temperature T1 in step S11. Upon determining that the value Tstop of the temperature T of the ceramic carrier 21 is lower than the evaporating temperature T1 (YES in step S11), the CPU 25a determines that moisture remains in and/or on the ceramic carrier 21 at this time.

In step S11, the CPU 25a can determine whether supply of power to the ceramic carrier 21 is the first time after an ignition switch of the motor vehicle is turned on by the driver. Upon determining that supply of power to the ceramic carrier 21 is the first time after the ignition switch of the motor vehicle is turned on by the driver (YES in step S11), the CPU 25a determines that moisture remains in the ceramic carrier 21 at this time.

Specifically, upon determining that moisture remains in and/or on the ceramic carrier 21 (YES in step S11), the CPU 25a proceeds to step S15. In step S15, the CPU 25a determines that there is a high possibility of bumping of moisture, setting or maintaining the bumping flag to ON (1). Otherwise, upon determining that the value Tstop of the temperature T of the ceramic carrier 21 is equal to or higher than the evaporating temperature T1, or supply of power to the ceramic carrier 21 is not the first time (NO in step S11), the CPU 25a proceeds to step S12.

Note that, when the engine 10 starts to operate, water vapor generated by the ignition of the engine 10 flows into the exhaust pipe 21a, resulting in a large amount of moisture in an atmosphere around the ceramic carrier 21. This causes the dew point to rise so that condensation is likely to occur. Additionally, because the operation in step S12 is based on the negative determination that the value Tnow of the temperature T of the ceramic carrier 21 is lower than the evaporating temperature T1, condensation is more likely to occur.

Thus, in step S12, the CPU 25a determines whether the engine 10 is in operation. Upon determining that the engine 10 is in operation, the CPU 25a determines that condensation forms on the ceramic carrier 21 (YES in step S12), setting or maintaining the bumping flag to ON (1) in step S15. Otherwise, upon determining that the engine 10 is not in operation, the CPU 25a determines that condensation does not form on the ceramic carrier 21 (NO in step S12), setting or maintaining the bumping flag to OFF (0) in step S13.

When the bumping flag has been set to OFF in step S13, the CPU 25a carries out "normal power control" described hereinafter in step S14.

Specifically, an increase of supply power to the ceramic carrier 21 can reduce time required for the temperature of the ceramic carrier 21 (ceramic layers 21b) to rise up to the activation temperature, that is, time required for the catalyst warm-up. However, an excessive increase of supply power to the ceramic carrier 21 may increase the amount of heat generated in the locally heated portion 21p as compared with the amount of heat transferred from the locally heated portion 21p to another portion. This may cause the locally heated portion 21p to excessively rise in temperature to a degree that there may be a risk of thermal damage of the ceramic carrier 21.

Thus, in order to prevent such a risk, the CPU 25a carries out the normal power control to determine normal power P0 such that the normal power P0 is a higher value to which there cannot be a risk of thermal damage of ceramic carrier 21, and supply the normal power P0 to the ceramic carrier 21. This aims to prevent such a risk while reducing time required for the catalyst warm-up as much as possible.

In contrast, when the bumping flag has been set to ON in step S15, the CPU 25a carries out "low power control" described hereinafter in step S16.

Specifically, even if moisture remains in and/or on the ceramic carrier 21, a low amount of power supply to the ceramic carrier 21 allows the moisture to gradually evaporate with the moisture escaping to the channels 21a (see the arrows 21y in FIG. 4). This reduces a risk of the thermal expansion of the moisture without escape, that is, the bumping of the moisture (see the reference character 21x in FIG. 4), thus preventing thermal damage of the ceramic carrier 21.

Thus, the CPU 25a carries out the low power control to determine low power P1 such that the low power P1 is a higher value to which there cannot be a risk of the bumping of moisture in and/or on the ceramic carrier 21 and is lower than the normal power P0, and supply the low power P1 to the ceramic carrier 21. This aims to prevent such a risk of the bumping of moisture in and/or on the ceramic carrier 21 while reducing time required for the catalyst warm-up as much as possible.

Figure 6:
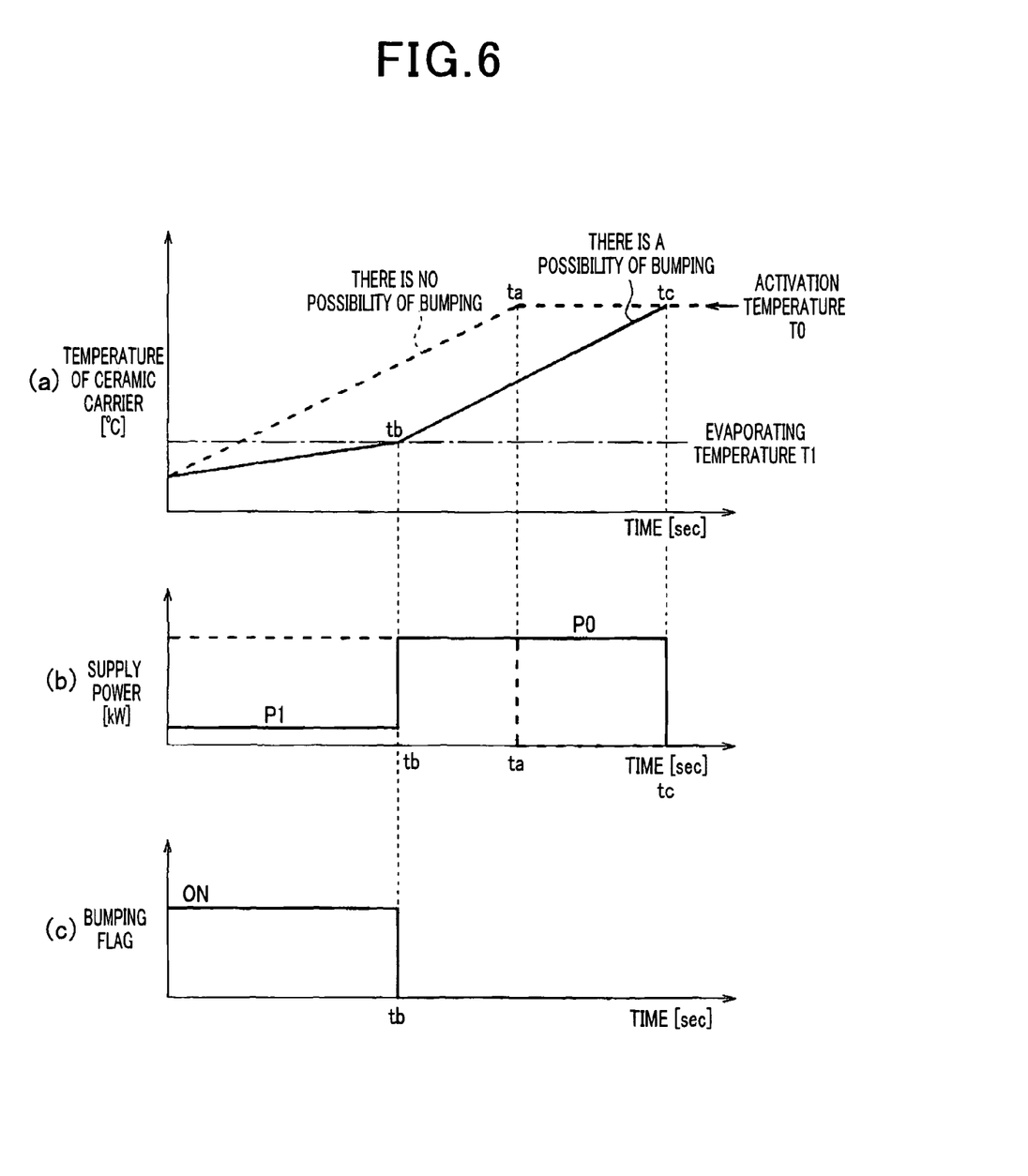
FIG. 6 is a timing chart schematically illustrating the transitions of the temperature of the ceramic carrier and the amount of supply power to the ceramic carrier depending on the state of a bumping flag during the CPU running the power control program according to the first embodiment.

FIG. 6 is a timing chart schematically illustrating the transitions of the temperature T of the ceramic carrier 21 (catalyst layers 21b) and the amount of supply power to the ceramic carrier 21 depending on the state of the bumping flag during the CPU 25a running the power control program PR1.

When the catalyst warm-up request is presented with the bumping flag set to OFF, the normal power P0 is supplied to the ceramic carrier 21 under the normal power control (see dashed line in (b) of FIG. 6) because the bumping flag of OFF represents that there is no possibility of bumping of moisture. This causes the temperature T of the ceramic carrier 21 to rise as shown by dashed lines in (a) of FIG. 6. When the temperature T of the ceramic carrier 21 reaches the activation temperature T0 at time ta, the catalyst warm-up is completed so that the supply of power to the ceramic carrier 21 is stopped (see time ta in (b) of FIG. 6).

In contrast, when the catalyst warm-up request occurs with the bumping flag set to ON as illustrated in (c) of FIG. 6, the low power P1 is supplied to the ceramic carrier 21 under the low power control (see solid line in (b) of FIG. 6) because the bumping flag of ON represents that there is a high possibility of bumping of moisture. This results in that, as illustrated by solid line in (a) of FIG. 6, the temperature T of the ceramic carrier 21 rises gradually under the low power control as compared with that under the normal power control. This allows moisture containing condensation to gradually evaporate with the moisture escaping to the channels 21a (see the arrows 21y in FIG. 4), making it possible to prevent the bumping of the moisture.

Thereafter, when the temperature T of the ceramic carrier 21 reaches the evaporating temperature T1 at time tb, the bumping flag is changed to OFF so that supply power to the ceramic carrier 21 is increased from the low power P1 to the normal power P0 (see time ta in (b) of FIG. 6). This is because, even if moisture was contained in the ceramic carrier 21, the temperature T of the ceramic carrier 21 equal to or higher than the evaporating temperature T1 causes the moisture to evaporate to disappear, and therefore, it is possible to increase supply power from the low power P1 to the normal power P0 without concern for the occurrence of bumping of moisture.

Thereafter, when the temperature T of the ceramic carrier 21 reaches the activation temperature T0 at time tc, the catalyst warm-up is completed so that the supply of power to the ceramic carrier 21 is stopped (see time tc in (b) of FIG. 6).

As described above, the power-supply control apparatus according to the first embodiment is provided with a moisture determiner to determine whether moisture is contained in the ceramic carrier 21 corresponding to the operations in steps S10 to S12. When it is determined that the moisture is contained in the ceramic carrier 21, the power-supply control apparatus serves a power controller to supply the low power P1 to the ceramic carrier 21; the low power P1 is lower than the normal power P0 supplied to the ceramic carrier 21 when it is determined that the moisture is not contained in the ceramic carrier 21.

Thus, even if moisture remains in and/or on the ceramic carrier 21, the low power P1 supplied to the ceramic carrier 21 allows the moisture to gradually evaporate with the moisture or condensation escaping to the channels 21a (see the arrows 21y in FIG. 4). This reduces a risk of the thermal expansion of the moisture or condensation without escape, that is, the bumping of the moisture (see the reference character 21x in FIG. 4), thus preventing thermal damage of the ceramic carrier 21.

In addition, the power-supply control apparatus according to the first embodiment is configured to determine that no moisture is contained in the ceramic carrier 21 (set the bumping flag to OFF) without executing the determinations based on the operations in steps S11 and S12 if the present value Tnow of the temperature T of the ceramic carrier 21 is equal to or higher than the evaporating temperature T1 of, for example, 100° C. Thus, the configuration determines whether moisture is contained in and/or on the ceramic carrier 21 with high accuracy.

Moreover, the power-supply control apparatus according to the first embodiment is provided with a remainder determiner corresponding to the operation in step S11. The remainder determiner focuses on cases where water vapor generated by the ignition of the engine 10 during the last operating time is adhered onto the ceramic carrier 21 to remain thereon.

Specifically, the remainder determiner is designed to determine that the remainder of moisture is present on the ceramic carrier 21 to thereby set the bumping flag to ON when determining that the value Tstop of the temperature T of the ceramic carrier 21 at the last engine shut down is lower than the preset evaporating temperature T1 or supply of power to the ceramic carrier 21 is the first time after an ignition switch of the motor vehicle is turned on by the driver. Thus, the configuration determines whether moisture (water vapor) is contained in and/or on the ceramic carrier 21 with high accuracy.

Furthermore, the power-supply control apparatus according to the first embodiment is provided with a condensation determiner corresponding to the operation in step S12. The condensation determiner focuses on cases where the engine starting results in a large amount of moisture in an atmosphere around the ceramic carrier 21, which causes the dew point to rise so that condensation may form on the ceramic carrier 21.

Specifically, the condensation determiner is designed to determine that condensation forms on the ceramic carrier 21 to thereby set the bumping flag to ON when determining that both the preset value Tnow of the temperature T of the ceramic carrier 21 is lower than the preset evaporating temperature T1, and the engine 10 is in operation. Thus, the configuration determines whether moisture (condensation) is contained in and/or on the ceramic carrier 21 with high accuracy.

Particularly, the ceramic carrier 21 having the NTC characteristic causes the amount of heat of the lower resistance portion (locally heated portion) 21p of the ceramic carrier 21 corresponding to the resistor R1 to increase more than another unit portion. As the locally heated portion 21p drops in resistance, the locally heated portion 21p more increases in temperature, accelerating an increase in the temperature of the locally heated portion 21p. The abrupt increase in the temperature of the locally heated portion 21p may easily cause bumping of moisture in and/or on the ceramic carrier 21. However, in the first embodiment, because the power-supply control apparatus according to the first embodiment reduces a risk of the occurrence of bumping of moisture, it is possible to enhance the reliability of the EHC converter 20 whose ceramic carrier 21 has the NTC characteristic.

Second Embodiment

A power-supply control apparatus according to the second embodiment of the present disclosure will be described hereinafter with reference to FIGS. 7 and 8.

The structure and/or functions of the power-supply apparatus according to the second embodiment are different from those of the power-supply apparatus according to the first embodiment by the following points. So, the different points will be mainly described hereinafter.

Figure 7:
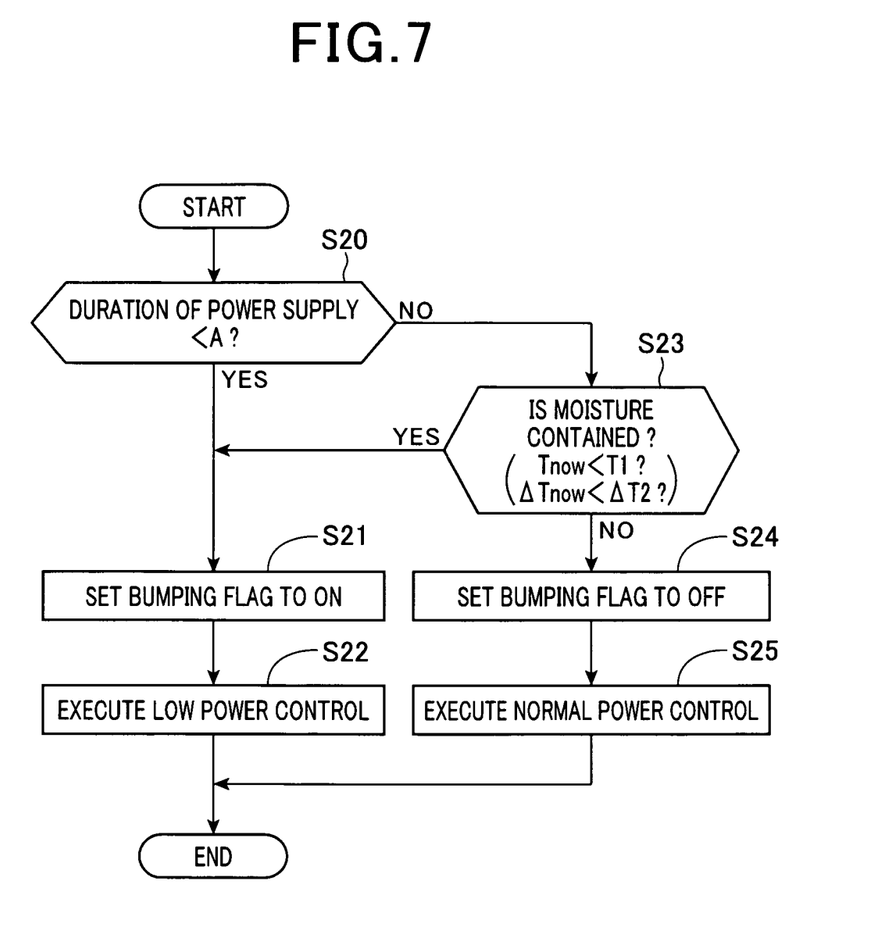
FIG. 7 is a flowchart schematically illustrating a sequence of operations of the CPU of the controller in accordance with a power control program according to the second embodiment of the present disclosure.

The power-supply apparatus according to the second embodiment is configured to carry out a sequence of operations illustrated in FIG. 7 in accordance with a power control program PR2 stored in the storage medium 25b in place of or in addition to the power control program PR1 (see FIG. 3). Of course, the power control program PR2 can be omitted in the storage medium 25b of the controller 25 according to the first embodiment.

Specifically, the operations in steps S10, S11, and S12 in the sequence of the operations illustrated in FIG. 5 are replaced with the operations in steps S20 and S23 in the sequence of the operations illustrated in FIG. 7.

The CPU 25a repeatedly runs the power control program PR2 in a preset cycle during catalyst warm-up being requested to the CPU 25a when the temperature of the catalyst layers 21b, that is, the temperature of the ceramic carrier 21 is lower than the activation temperature of the catalyst layers 21b.

When launching the power control program PR2, the CPU 25a determines whether, an elapsed time since the start of power supply to the ceramic carrier 21 is shorter than a preset time A in step S20. In other words, the CPU 25a determines whether the duration of power supply to the ceramic carrier 21 is shorter than the preset time A in step S20.

Upon determining that the elapsed time is shorter than the preset time A (YES in step S20), the CPU 25a determines that the present timing is within an early stage of power-supply process for the catalyst warm-up. Then, the CPU 25a determines that there is a high possibility of bumping of moisture, setting or maintaining the bumping flag to ON (1) in step S21. Thereafter, the CPU 25a carries out the low power control in step S22; the low power control is identical to that in step S16.

Otherwise, upon determining that the elapsed time is equal to or longer than the preset time A (NO in step S20), the CPU 25a determines that the present timing is not within the early stage of the power-supply process for the catalyst warm-up, proceeding to step S23.

In step S23, the CPU 25a determines whether moisture in the ceramic carrier 21 has evaporated to disappear due to the low power control within the early stage of the power-supply process.

Specifically, as well as the operation in step S10, the CPU 25a determines whether a value mow of the temperature at this time is lower than the preset evaporating temperature T1, such as 100° C. in step S23. In other words, the CPU 25a determines whether the equation "Tnow<T1" is established in step S23.

Upon determining that the value Tnow of the temperature T of the ceramic carrier 21 is lower than the preset evaporating temperature T1 (YES in step S23), the CPU 25a considers that there is a possibility of moisture being contained in the ceramic carrier 21, and determines that moisture remains in and/or on the ceramic carrier 21, proceeding to step S21.

In step S21, the CPU 25a can determine whether the rate ΔTnow of change of the temperature T of the ceramic carrier 21 is lower than a preset threshold ΔT2, that is, determines whether the equation "ΔTnow<T2" is established. Note that the rate ΔTnow of change of the temperature T of the ceramic carrier 21 is an absolute value of the rate ΔTnow of increase/decrease of the temperature T of the ceramic carrier 21. The rate ΔTnow of change of the temperature T of the ceramic carrier 21 represents the amount of change of the temperature T of the ceramic carrier 21 per unit of time.

Upon determining that the rate ΔTnow of change of the temperature T of the ceramic carrier 21 is lower than the preset threshold ΔT2 (YES in step S23), the CPU 25a considers that there is a possibility of moisture being contained in the ceramic carrier 21 for the following reason, and determines that moisture remains in and/or on the ceramic carrier 21, proceeding to step S21.

Specifically, if the ceramic carrier 21 is energized with moisture contained in the ceramic carrier 21, part of thermal energy generated in the ceramic carrier 21 due to the energization is lost as heat of evaporation of the moisture. Thus, the rate of rise of the temperature T of the ceramic carrier 21, that is, the rate of change of the temperature T of the ceramic carrier 21 with respect to the amount of supply power to the ceramic carrier 21 is reduced. For this reason, upon determining that the rate ΔTnow of change of the temperature T of the ceramic carrier 21 is lower than the preset threshold ΔT2 (ΔTnow<ΔT2), the CPU 25a determines that moisture remains in and/or on the ceramic carrier 21, proceeding to step S21.

Note that, in step S23, the CPU 25a can determine that moisture remains in and/or on the ceramic carrier 21 upon determining that: either the first condition of "Tnow<T1" or the second condition of "ΔTnow<ΔT2" is established, or both the first condition of "Tnow<T1" or the second condition of "ΔTnow<ΔT2" are established.

Otherwise, upon determining that the value Tnow of the temperature T of the ceramic carrier 21 is equal to or higher than the preset evaporating temperature T1 and/or the rate ΔTnow of change of the temperature T of the ceramic carrier 21 is equal to or higher than the preset threshold ΔT2 (NO in step S23), the CPU 25a determines that no moisture remains in and/or on the ceramic carrier 21, proceeding to step S24. In step S24, the CPU 25a sets or maintains the bumping flag to OFF (0), and carries out the normal power control in step S25; the normal power control is identical to that in step S14.

To sum up, if the present timing is within the early stage of the power-supply process, the CPU 25a carries out the low power control while preventing the normal power control without executing the determinations in steps S10, S11, and S12 illustrated in FIG. 5. In addition, even after the early stage of the power-supply process, the CPU 25*a* continues the low power control until the CPU 25*a* determines that no moisture remains in and/or on the ceramic carrier 21 in step S23, and carries out the normal power control after the determination of that no moisture remains in and/or on the ceramic carrier 21.

Figure 8:
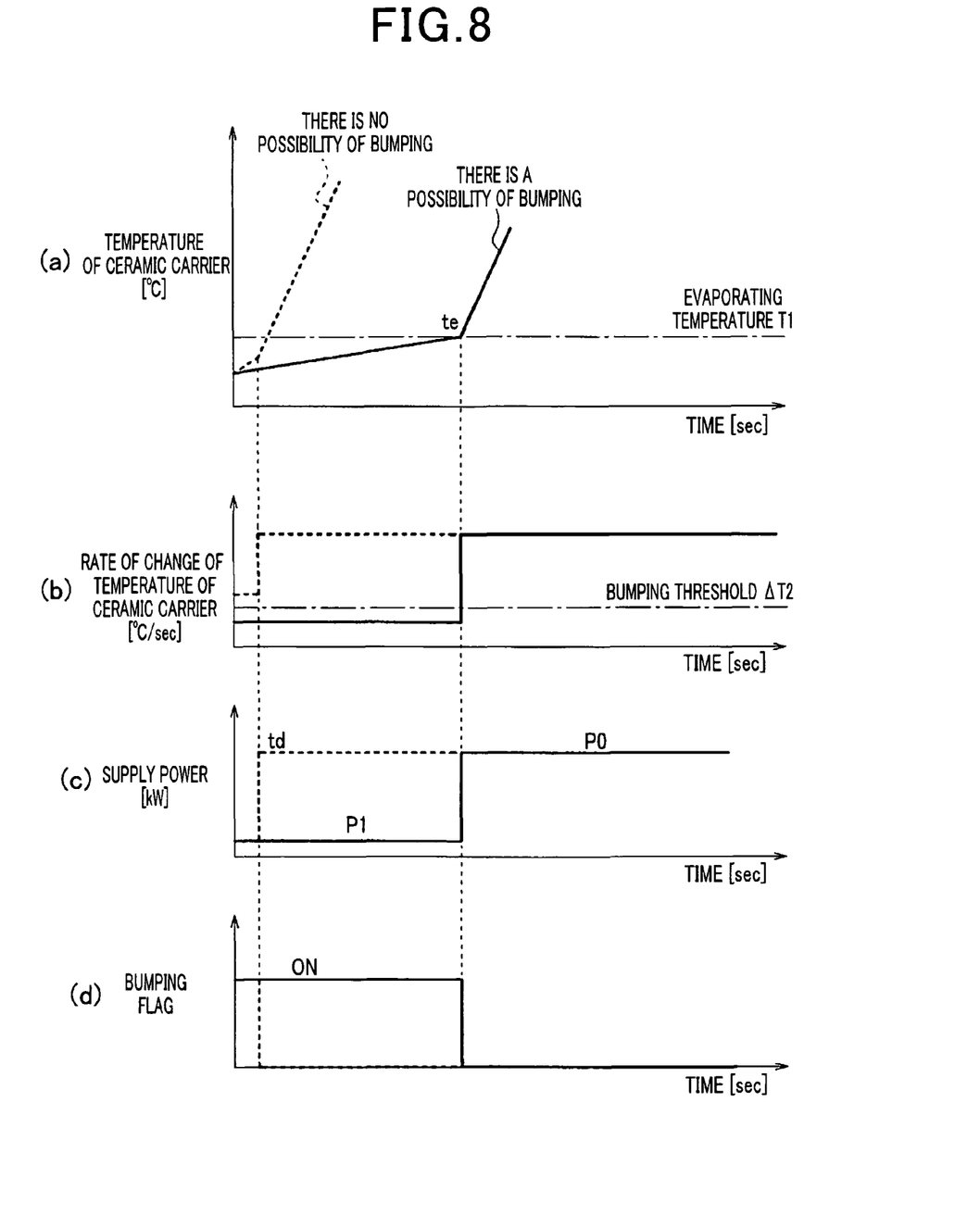
FIG. 8 is a timing chart schematically illustrating the transitions of the temperature of the ceramic carrier, the rate of change of the temperature, and the amount of supply power to the ceramic carrier depending on the state of the bumping flag during the CPU running the power control program according to the second embodiment.

FIG. 8 is a timing chart schematically illustrating the transitions of the temperature T of the ceramic carrier 21 (catalyst layers 21*b*), the rate ΔTnow of change of the temperature T of the ceramic carrier 21, and the amount of supply power to the ceramic carrier 21 depending on the state of the bumping flag during the CPU 25*a* running the power control program PR2.

In the early stage of the power-supply process for the catalyst warm-up from the start of power supply to the ceramic carrier 21 to time td at which the preset time A has elapsed since the start of power supply to the ceramic carrier 21, the bumping flag is forcibly set to ON (see (c) and (d) of FIG. 8). If no moisture remains in and/or on the ceramic carrier 21, the rate of rise of the temperature T of the ceramic carrier 21 is faster than that if moisture remains in and/or the ceramic carrier 21 (see (a) of FIG. 8). That is, the rate ΔTnow of change of the temperature T of the ceramic carrier 21 if no moisture remains in and/or on the ceramic carrier 21 is higher than that if moisture remains in and/or on the ceramic carrier 21 (see (b) of FIG. 8).

If the rate ΔTnow of change of the temperature T of the ceramic carrier 21 is equal to or higher than the preset threshold ΔT2 due to no moisture in and/or on the ceramic carrier 21 in an example illustrated by the dash line in (b) of FIG. 8, supply power to the ceramic carrier 21 is increased from the low power P1 to the normal power P0 at the time td.

In contrast, the rate ΔTnow of change of the temperature T of the ceramic carrier 21 is lower than the preset threshold ΔT2 due to moisture in and/or on the ceramic carrier 21 at time td in an example illustrated by the solid line in (b) of FIG. 8, the low power control is continued even after the lapse of the early stage of the power-supply process. Thereafter, when the temperature T of the ceramic carrier 21 reaches the evaporating temperature T1 at time te, the bumping flag is changed from ON to OFF so that the supply power to the ceramic carrier 21 is increased from the low power P1 to the normal power P0.

As described above, the power-supply apparatus according to the second embodiment is configured to carry out the low power control within the early stage of the power supply process. This prevents the occurrence of bumping due to the supply of the normal power P0 to the ceramic carrier 21 at the start of the energization of the ceramic carrier 21.

The power-supply apparatus according to the second embodiment is also configured to, if the value Tnow of the temperature T of the ceramic carrier 21 at this time is lower than the evaporating temperature T1, consider that there is a high possibility of moisture remaining in and/or on the ceramic carrier 21, then continuing the low power control after the lapse of the early state of the power supply process. This easily determines whether moisture is contained in and/or on the ceramic carrier 21, and reliably prevents the occurrence of bumping. If the rate ΔTnow of change of the temperature T of the ceramic carrier 21 is lower than the preset threshold ΔT2, the power-supply apparatus according to the second embodiment considers that there is a high possibility of moisture remaining in and/or on the ceramic carrier 21, then continuing the low power control after the lapse of the early state of the power supply process. This reliably prevents the occurrence of bumping.

Third Embodiment

A power-supply control apparatus according to the third embodiment of the present disclosure will be described hereinafter with reference to FIG. 9.

The structure and/or functions of the power-supply apparatus according to the third embodiment are different from those of the power-supply apparatus according to the second embodiment by the following point. So, the different point will be mainly described hereinafter.

The power-supply apparatus according to the second embodiment is programmed to determine that moisture is contained in the ceramic carrier 21, in other words, there is a possibility of bumping in step S23 of FIG. 7 if the rate ΔTnow of change of the temperature T of the ceramic carrier 21 is lower than the preset threshold ΔT2 after the lapse of the early stage of the power-supply process.

In contrast, the power-supply apparatus according to the third embodiment focuses on the fact that the rate ΔInow of change of current I supplied from the power source 24 to the ceramic carrier 21 correlates with the rate ΔTnow of change of the temperature T of the ceramic carrier 21. Thus, the power-supply apparatus according to the third embodiment is programmed to determine, in step S23, that moisture is contained in the ceramic carrier 21 if the rate ΔInow of change of the current I supplied to the ceramic carrier 21 is lower than a preset threshold ΔI3 after the lapse of the early stage of the power-supply process. Note that the rate ΔInow of change of the current I supplied to the ceramic carrier 21 is an absolute value of the rate ΔInow of increase/decrease of the current I supplied to the ceramic carrier 21. The rate ΔInow of change of the current I supplied to the ceramic carrier 21 represents the amount of change of the current I supplied to the ceramic carrier 21 per unit of time.

Figure 9:
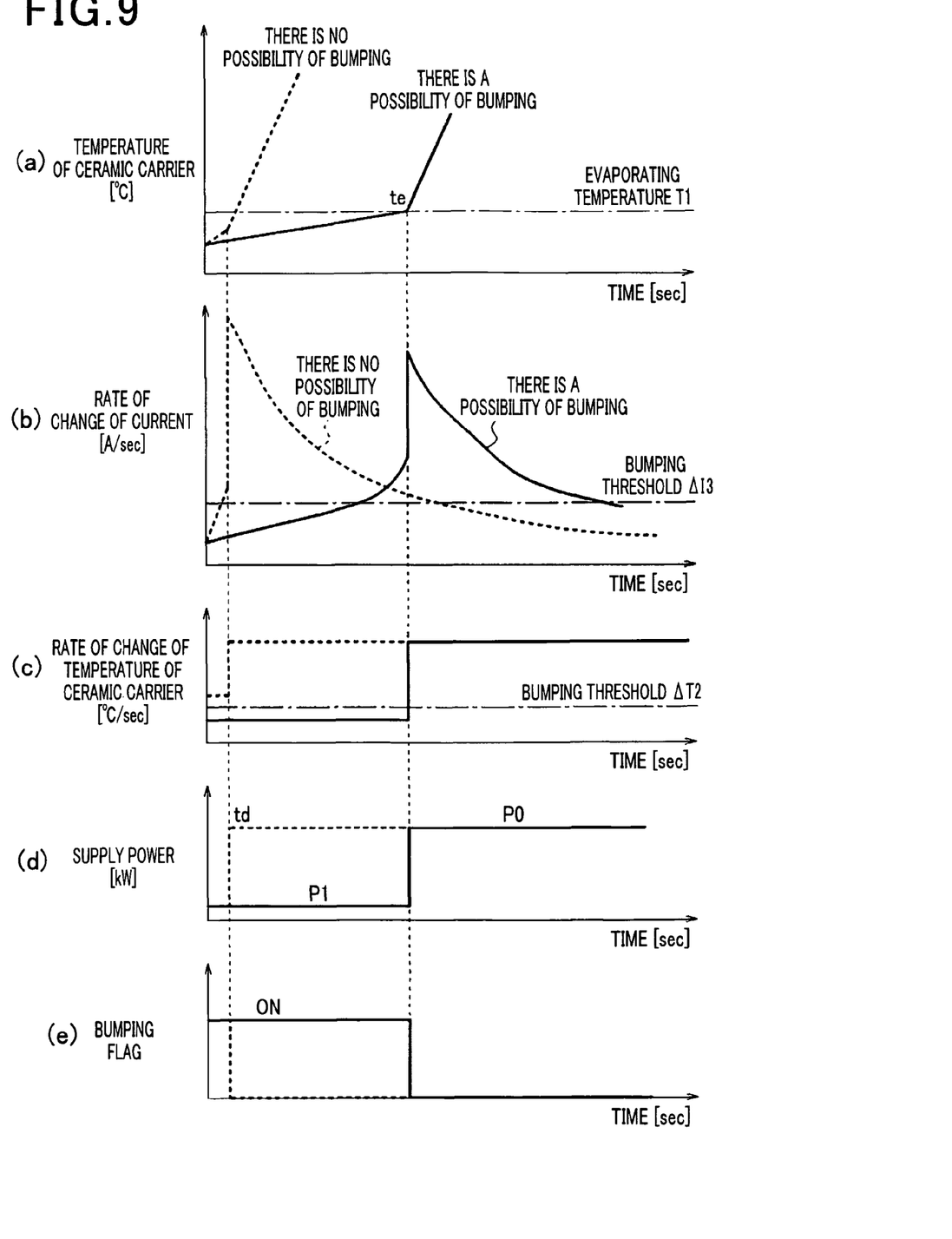
FIG. 9 is a liming chart schematically illustrating the transitions of the temperature of the ceramic carrier, the rate of change of current supplied to the ceramic carrier, and the amount of supply power to the ceramic carrier depending on the state of the bumping flag during the CPU running the power control program according to the third embodiment of the present disclosure.

FIG. 9 is a timing chart schematically illustrating the transitions of the temperature T of the ceramic carrier 21 (catalyst layers 21*b*), the rate ΔInow of change of the current I supplied to the ceramic carrier 21, and the amount of supply power to the ceramic carrier 21 depending on the state of the bumping flag during the CPU 25*a* running the power control program PR2.

In the early stage of the power-supply process for the catalyst warm-up from the start of power supply to the ceramic carrier 21 to time td at which the preset time A has elapsed since the start of power supply to the ceramic carrier 21, the bumping flag is forcibly set to ON (see (c) and (d) of FIG. 9). If no moisture remains in and/or on the ceramic carrier 21, the rate of rise of the temperature T of the ceramic carrier 21 is faster than that if moisture remains in and/or the ceramic carrier 21 (see (c) of FIG. 9). That is, the rate ΔTnow of change of the temperature T of the ceramic carrier 21 if no moisture remains in and/or on the ceramic carrier 21 is higher than that if moisture remains in and/or on the ceramic carrier 21 (see (c) of FIG. 9).

Because the ceramic carrier 21 has the NTC characteristic, the resistance R of the ceramic carrier 21 drops with rise in the temperature T of the ceramic carrier 21, resulting in an increase in the current I supplied to the ceramic carrier 21. Specifically, as illustrated in (b) and (c) of FIG. 9, the rate ΔTnow of temperature change of the ceramic carrier 21 has a correlation with the rate ΔInow of change of the current supplied to the ceramic carrier 21. Thus, as well as the rate ΔT of temperature change of the ceramic carrier 21, the rate ΔInow of change of the current supplied to the ceramic carrier 21 if no moisture remains in and/or on the ceramic carrier 21 is higher than that if moisture remains in and/or on the ceramic carrier 21 (see (b) of FIG. 9).

In an example illustrated by the dash line in (b) of FIG. 9, the rate ΔInow of change of the current supplied to the ceramic carrier 21 is equal to or higher than the preset threshold ΔI3 due to no moisture in and/or on the ceramic carrier 21. Thus, supply power to the ceramic carrier 21 is increased from the low power P1 to the normal power P0 at the time td.

In contrast, the rate ΔInow of change of the current supplied to the ceramic carrier 21 is lower than the preset threshold ΔI3 due to moisture in and/or on the ceramic carrier 21 at time td in an example illustrated by the solid line in (b) of FIG. 9. Thus, the low power control is continued even after the lapse of the early stage of the power-supply process. Thereafter, when the temperature T of the ceramic carrier 21 reaches the evaporating temperature T1 at time te, the bumping flag is changed from ON to OFF so that the supply power to the ceramic carrier 21 is increased from the low power P1 to the normal power P0.

As described above, the power-supply apparatus according to the third embodiment, which determines whether moisture is contained in and/or on the ceramic carrier 21 based on the rate ΔInow of change of the current supplied to the ceramic carrier 21 after the lapse of the early stage of the power-supply process, achieves the same technical effects as the power-supply apparatus according to the second embodiment, which determines whether moisture is contained in and/or on the ceramic carrier 21 based on the rate ΔTnow of temperature change of the ceramic carrier 21.

Fourth Embodiment

A power-supply control apparatus according to the fourth embodiment of the present disclosure will be described hereinafter with reference to FIG. 10.

The structure and/or functions of the power-supply apparatus according to the fourth embodiment are different from those of the power-supply apparatus according to the second embodiment by the following point. So, the different point will be mainly described hereinafter.

The power-supply apparatus according to the fourth embodiment focuses on the fact that the rate ΔRnow of resistance change of the ceramic carrier 21 correlates with the rate ΔTnow of change of the temperature T of the ceramic carrier 21. Thus, the power-supply apparatus according to the fourth embodiment is programmed to determine, in step S23, that moisture is contained in the ceramic carrier 21 if the rate ΔRnow of resistance change of the ceramic carrier 21 is equal to or higher than a preset threshold ΔR3 after the lapse of the early stage of the power-supply process. Note that the rate ΔRnow of change of the resistance R of the ceramic carrier 21 is an absolute value of the rate ΔRnow of increase/decrease of the resistance R of the ceramic carrier 21. The rate ΔRnow of change of the resistance R of the ceramic carrier 21 represents the amount of change of the resistance R of the ceramic carrier 21 per unit of time.

Figure 10:
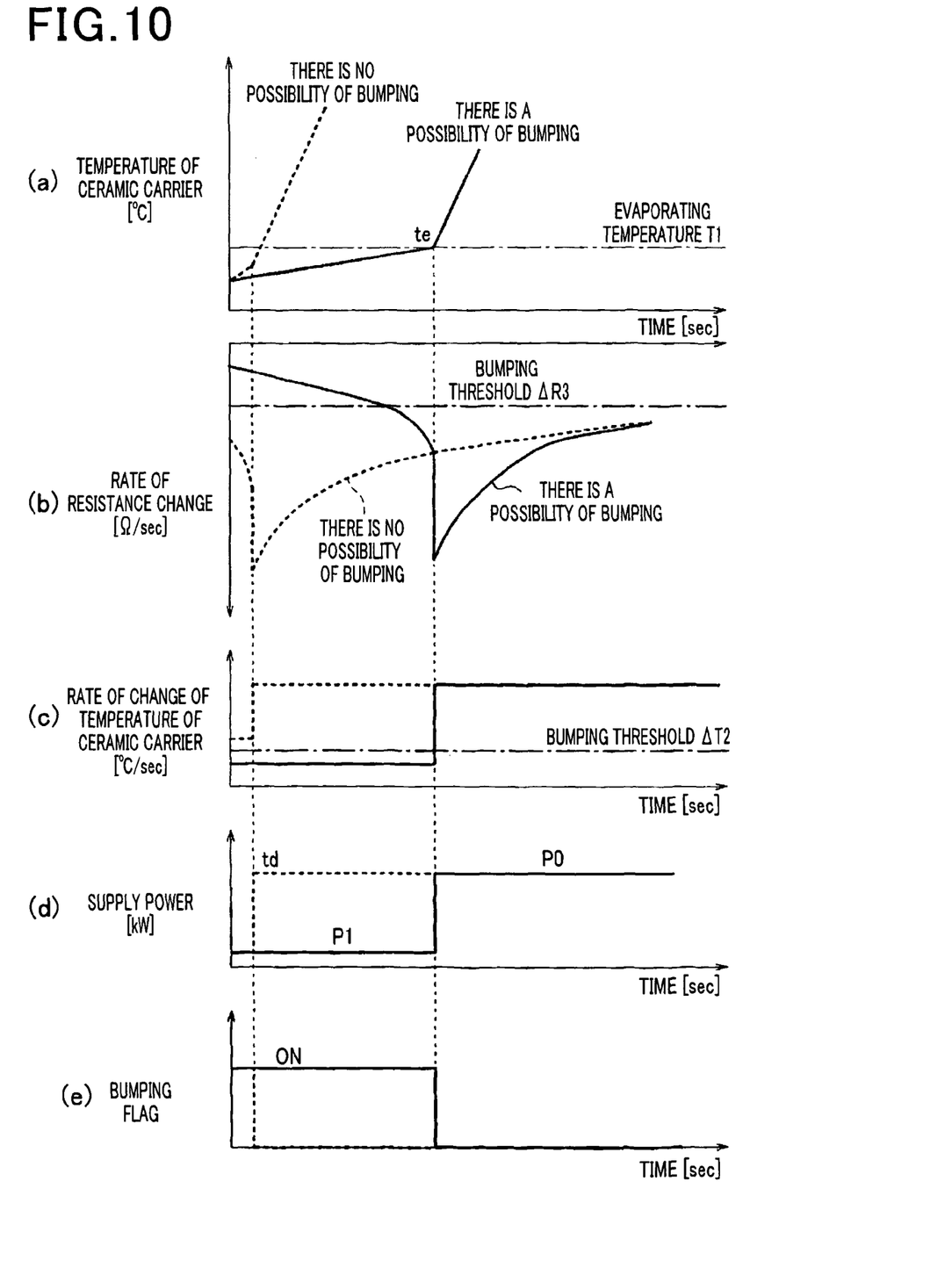
FIG. 10 is a timing chart schematically illustrating the transitions of the temperature of the ceramic carrier, the rate of resistance change of the ceramic carrier, and the amount of supply power to the ceramic carrier depending on the state of the bumping flag during the CPU running the power control program according to the fourth embodiment of the present disclosure.

FIG. 10 is a timing chart schematically illustrating the transitions of the temperature T of the ceramic carrier 21 (catalyst layers 21b), the rate ΔRnow of resistance change of the ceramic carrier 21, and the amount of supply power to the ceramic carrier 21 depending on the state of the bumping flag during the CPU 25a running the power control program PR2.

In the early stage of the power-supply process for the catalyst warm-up from the start of power supply to the ceramic carrier 21 to time td at which the preset time A has elapsed since the start of power supply to the ceramic carrier 21, the bumping flag is forcibly set to ON (see (c) and (d) of FIG. 10). If no moisture remains in and/or on the ceramic carrier 21, the rate of rise of the temperature T of the ceramic carrier 21 is faster than that if moisture remains in and/or the ceramic carrier 21 (see (c) of FIG. 9). That is, the rate ΔTnow of change of the temperature T of the ceramic carrier 21 if no moisture remains in and/or on the ceramic carrier 21 is higher than that if moisture remains in and/or on the ceramic carrier 21 (see (c) of FIG. 10).

Because the ceramic carrier 21 has the NTC characteristic, the resistance R of the ceramic carrier 21 drops with rise in the temperature T of the ceramic carrier 21. Specifically, as illustrated in (b) and (c) of FIG. 10, the rate ΔTnow of temperature change of the ceramic carrier 21 has a correlation with the rate ΔRnow of resistance change of the ceramic carrier 21. Thus, the rate ΔRnow of resistance change of ceramic carrier 21 if no moisture remains in and/or on the ceramic carrier 21 is lower than that if moisture remains in and/or on the ceramic carrier 21 (see (b) of FIG. 10).

In an example illustrated by the dash line in (b) of FIG. 10, the rate ΔRnow of resistance change of the ceramic carrier 21 is lower than the preset threshold ΔR3 due to no moisture in and/or on the ceramic carrier 21. Thus, supply power to the ceramic carrier 21 is increased from the low power P1 to the normal power P0 at the time td.

In contrast, the rate ΔRnow of resistance change of the ceramic carrier 21 is equal to or higher than the preset threshold ΔR3 due to moisture in and/or on the ceramic carrier 21 at time td in an example illustrated by the solid line in (b) of FIG. 10. Thus, the low power control is continued even after the lapse of the early stage of the power-supply process. Thereafter, when the temperature T of the ceramic carrier 21 reaches the evaporating temperature T1 at time te, the bumping flag is changed from ON to OFF so that the supply power to the ceramic carrier 21 is increased from the low power P1 to the normal power P0.

As described above, the power-supply apparatus according to the fourth embodiment, which determines whether moisture is contained in and/or on the ceramic carrier 21 based on the rate ΔRnow of resistance change of the ceramic carrier 21 after the lapse of the early stage of the power-supply process, achieves the same technical effects as the power-supply apparatus according to the second embodiment, which determines whether moisture is contained in and/or on the ceramic carrier 21 based on the rate ΔTnow of temperature change of the ceramic carrier 21.

The present disclosure is not limited to the aforementioned embodiments, and can be modified as follows. Note that some of the subject matters of the first to fourth embodiments set forth above can be freely combined with each other.

The CPU 25a determines that moisture in and/or on the ceramic carrier 21 has evaporated to disappear if the value Tnow of the temperature T of the ceramic carrier 21 at this time is equal to or higher than the evaporating temperature T1 in each of steps S10 and S23, but the present disclosure is not limited thereto.

Specifically, the CPU 25a can determine that moisture in and/or on the ceramic carrier 21 has evaporated to disappear if a preset time has elapsed since the start of energization of the ceramic carrier 21 in at least one of steps S10 and S23. In this modification, the preset time can be variably set such that, the higher the temperature of the ceramic carrier 21 at the start of power supply to the ceramic carrier 21 is, the lower the preset time is.

The CPU 25a references the map M1 (the R-T characteristic) using the value of the resistance R of the ceramic carrier 21 as a key to calculate a vale of the temperature T of the ceramic carrier 21 in each of steps S10, S11, and S12, but the present disclosure is not limited thereto.

Specifically, the present disclosure can be provided with a temperature sensor mounted on the ceramic carrier 21, and use a measured value of the temperature sensor as a value of the temperature T of the ceramic carrier 21 in each of steps S10, S11, and S12. During the engine 10 being inactivated and the ceramic carrier 21 being deenergized, the temperature of the ceramic carrier 21 can be considered to be identical to outside air temperature, the temperature of the engine coolant, or the temperature of the intake air if the EHC converter 20 is sufficiently cooled. Thus, the present disclosure can use any one of the outside air temperature, the temperature of the engine coolant, or the temperature of the intake air as a value of the temperature T of the ceramic carrier 21 in each of steps S10, S11, and S12.

The present disclosure can freely combine the determining operations in steps S10, S11, and S12 and the determining operation in step S23 to determine whether moisture is contained in and/or on the ceramic carrier 21 in each of FIGS. 5 and 7.

In each of the first to fourth embodiments, the present disclosure is applied to the EHC converter 20 using the ceramic carrier 21 illustrated as an example in FIG. 2, but can be applied to an EHC converter using a conductive porous carrier that carries a catalyst.

In each of the first to fourth embodiments, the present disclosure is applied to the EHC converter whose carrier has the NTC characteristic set forth above, but can be applied to an EHC converter whose carrier does not have the NTC characteristic, that is, whose carrier has a characteristic in which resistance rises with temperature increase.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. An apparatus comprising:
   a conductive porous carrier of a catalyst converter for cleaning an emission out of an internal combustion engine, the conductive porous carrier carrying a catalyst of the catalyst converter, the conductive porous carrier being energized for warming of the catalyst; and
   a power supply controller which is operable with the conductive porous carrier and is configured to:
      determine whether a first condition that a temperature of the conductive porous carrier is lower than a preset evaporating temperature while the internal combustion engine is operating is satisfied; and
      control the power supply to the conductive porous carrier for energization of the conductive porous carrier such that a value of the power supply to the conductive porous carrier when it is determined that the first condition is satisfied is lower than a value of the power supply to the conductive porous carrier when it is determined that the first condition is unsatisfied.

2. The apparatus according to claim 1, wherein the power supply controller is further configured to:
   determine whether a second condition that the temperature of the conductive porous carrier at a last shutdown of the internal combustion engine is lower than the preset evaporating temperature is satisfied; and
   control the power supply to the conductive porous carrier for energization of the conductive porous carrier such that a value of the power supply to the conductive porous carrier when it is determined that the second condition is satisfied is lower than a value of the power supply to the conductive porous carrier when it is determined that the second condition is unsatisfied.

3. The apparatus according to claim 1, wherein the power supply controller is further configured to:
   determine whether a second condition that any one of an absolute value of a rate of change of the temperature of the conductive porous carrier and an absolute value of change of a physical parameter having a correlation with the temperature of the conductive porous carrier is lower than a preset value is satisfied; and
   control the power supply to the conductive porous carrier for energization of the conductive porous carrier such that a value of the power supply to the conductive porous carrier when it is determined that the second condition is satisfied is lower than a value of the power supply to the conductive porous carrier when it is determined that the second condition is unsatisfied.

4. The apparatus according to claim 1, wherein the conductive porous carrier has a characteristic in which resistance drops with temperature increase.

5. An apparatus comprising:
   a conductive porous carrier of a catalyst converter for cleaning an emission out of an internal combustion engine, the conductive porous carrier carrying a catalyst of the catalyst converter, the conductive porous carrier being energized for warming of the catalyst; and
   a power supply controller configured to:
      determine whether a preset time has elapsed since a start of the power supply to the conductive porous carrier;
      carry out low power control when it is determined that the preset time has not elapsed since the start of the power supply to the conductive porous carrier, the low power control controlling the power supply to the conductive porous carrier for energization of the conductive porous carrier such that a value of the power supply to the conductive porous carrier when it is determined that the preset time has not elapsed since the start of the power supply to the conductive porous carrier is lower than a value of the power supply when it is determined that the preset time has elapsed since the start of the power supply to the conductive porous carrier; and
      continue the low power control when a temperature of the conductive porous carrier is lower than a preset evaporating temperature after the preset time has been elapsed since the start of the power supply to the conductive porous carrier.

6. The apparatus according to claim 5, wherein the power supply controller is further configured to:
   determine whether a condition that the temperature of the conductive porous carrier at a last shutdown of the internal combustion engine is lower than a preset evaporating temperature is satisfied; and
   control the power supply to the conductive porous carrier for energization of the conductive porous carrier such that a value of the power supply to the conductive porous carrier when it is determined that the condition is satisfied is lower than a value of the power supply to the conductive porous carrier when it is determined that the condition is unsatisfied.

7. The apparatus according to claim 5, wherein the power supply controller is further configured to:
- determine whether a condition that a temperature of the conductive porous carrier is lower than a preset evaporating temperature while the internal combustion engine is operating is satisfied; and
- control the power supply to the conductive porous carrier for energization of the conductive porous carrier such that a value of the power supply to the conductive porous carrier when it is determined that the condition is satisfied is lower than a value of the power supply to the conductive porous carrier when it is determined that the condition is unsatisfied.

8. The apparatus according to claim 5, wherein the power supply controller is further configured to:
- determine whether a condition that any one of an absolute value of a rate of change of a temperature of the conductive porous carrier and an absolute value of change of a physical parameter having a correlation with the temperature of the conductive porous carrier is lower than a preset value is satisfied; and
- control the power supply to the conductive porous carrier for energization of the conductive porous carrier such that a value of the power supply to the conductive porous carrier when it is determined that the condition is satisfied is lower than a value of the power supply to the conductive porous carrier when it is determined that the condition is unsatisfied.

9. The apparatus according to claim 5, wherein the conductive porous carrier has a characteristic in which resistance drops with temperature increase.

\* \* \* \* \*